(12) United States Patent
Noh

(10) Patent No.: US 6,387,567 B1
(45) Date of Patent: May 14, 2002

(54) SECONDARY BATTERY

(75) Inventor: Hyung-gon Noh, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 09/545,462

(22) Filed: Apr. 7, 2000

(30) Foreign Application Priority Data

Apr. 16, 1999 (KR) ............................................ 99-13497

(51) Int. Cl.[7] ................................................ H01M 2/06
(52) U.S. Cl. ........................ 429/211; 429/185; 429/181; 429/178; 429/163
(58) Field of Search ........................... 429/65, 123, 162, 429/163, 178, 181, 185, 211

(56) References Cited

U.S. PATENT DOCUMENTS 3,607,401 A * 9/1971 Halpert et al. .................. 136/6
6,251,537 B1 * 6/2001 Kim et al. .................... 429/181

* cited by examiner

Primary Examiner—Carol Chaney
(74) Attorney, Agent, or Firm—Leydig, Voit, & Mayer, Ltd.

(57) ABSTRACT

A secondary battery includes an electrode assembly formed by sequentially stacking positive electrode plates each having a positive electrode tab formed at one side thereof, negative electrode plate each having a negative electrode tab formed at one side thereof, and separators interposed between the positive electrode plates and the negative electrode plates, for insulating the positive and negative electrode plates from each other, the positive electrode tabs being welded to each other to form a positive electrode tab group, and the negative electrode tabs being welded to each other to form a negative electrode tab group, a case having a lower case part having a space in which the electrode assembly is accommodated, and an upper case part connected to one side periphery of the lower case part and fixed to the lower case part, for hermetically sealing the space of the lower case part, the upper case part and the lower case part having sealing portions at the peripheries thereof to be sealed to each other, a positive electrode terminal welded to the positive electrode tab group, the positive electrode tab group being supported in the sealing portion and protruding outward from the case, a negative electrode terminal welded to the negative electrode tab group, the negative electrode tab group being supported in the sealing portion thereof and protruding outward from the case, and an electrolytic solution blocking member which envelops the electrode assembly. The productivity and safety of the battery can be improved.

9 Claims, 4 Drawing Sheets

SECONDARY BATTERY

BACKGROUND OF THE INVENTION

1. Field of the Invention

The present invention relates to a secondary battery, and more particularly, to a secondary battery which has an improved structure in which charging and discharging improve the battery capacity.

2. Description of the Related Art

In general, secondary batteries capable of charging and discharging are applied to portable electronic apparatus such as cellular phones, notebook-type computers, computer camcorders and the like, and research into secondary batteries is being vigorously conducted.

In particular, secondary batteries are classified into a variety of batteries, including nickel-cadmium (Ni—Cd) batteries, lead acid storage batteries, nickel metal hydride (Ni—MH) batteries, lithium ion batteries, lithium polymer batteries, metal lithium batteries, air-zinc acid storage batteries, and the like.

Among the above-mentioned batteries, lithium batteries have a service life three times longer than Ni—Cd batteries or Ni—MH batteries and are in widespread use in terms of their excellent energy density per unit weight.

Lithium batteries are classified into liquid electrolyte batteries and polymer electrolyte batteries according to the type of electrolyte used. Generally, batteries using a liquid electrolyte are called lithium ion batteries and batteries using a polymer electrolyte are called lithium polymer batteries.

Lithium secondary batteries may have various shapes. Typically, cylindrical or prismatic batteries are fabricated to be used mainly as lithium-ion batteries. Lithium polymer secondary batteries have flexibility so that they are relatively free in view of shape design. Accordingly, lithium polymer secondary batteries having excellent safety and freedom in shape design and being light-weight are advantageous in attaining miniaturized and light-weight portable electronic apparatus, and research into the lithium polymer secondary battery is being carried out in various manners.

The above-described lithium polymer secondary battery is schematically shown in FIG. 1.

Referring to FIG. 1, the lithium polymer secondary battery includes an electrode assembly, a lower case 11 having a space 11a in which the electrode assembly is accommodated, and an upper case 12 for hermetically closing the space 11a of the lower case 11. One side periphery of the upper case 12 is connected to the lower case 11.

The electrode assembly has positive electrode plates 13 and negative electrode plates 14 stacked sequentially, with separators 15 interposed therebetween. A positive electrode tab extends from the positive electrode plate 13 at one side thereof and a negative electrode tab extends from the negative electrode plate 14 at one side thereof. A plurality of positive electrode tabs at the positive electrode plates 13 are mutually welded to form a positive electrode tab group 16. Also, a plurality of negative electrode tabs drawn out from the negative electrode plates 14 in the same direction are mutually welded to form a negative electrode tab group 17. A positive electrode terminal 18 and a negative electrode terminal 19 are welded to the positive and negative electrode tab groups 16 and 17, respectively, to then be drawn outside the upper and lower case values 11 and 12.

In the lithium polymer secondary battery having the above-described configuration, the upper and lower cases 11 and 12 which are Al multi-film pouches, are formed of various materials such as nylon, polyethylene (PE), aluminum (Al), ethyl acetic acid (EAA), polyethylene terephthalate (PET), polypropylene (PP) and the like. An electrolytic solution is injected into the upper and lower cases 11 and 12 and then the electrode assembly is installed therein. In this case, when the electrode assembly is inserted into the upper and lower cases 11 and 12 and then the upper and lower cases 11 and 12 are sealed, the electrolytic solution sticking to the portions of the positive electrode tab group 16 and the negative electrode tab group 17 stick to the sealing portions at the peripheries of the upper and lower cases 11 and 12, which results in a sealing strength that is insufficient.

As shown in FIG. 1, the positive electrode terminal 18 made of Al and the negative electrode terminal 19 made of Cu or Ni which protrude outside the upper and lower cases 11 and 12 must be folded to be connected to a terminal (not shown) of a battery pack. However, in this case, the positive and negative electrode terminals 18 and 19 may contact the upper or lower case 11 or 12 in a direction in which the positive and negative electrode terminals 18 and 19 are folded, thereby undesirably causing shorts in the battery.

SUMMARY OF THE INVENTION

To solve the above problems, it is an object of the present invention to provide a secondary battery having improved safety and productivity, by preventing an electrolytic solution from sticking to the sealing portion of a case and preventing a short-circuiting from occurring due to contact between the case and terminals protruding outside the case.

Accordingly, to achieve the above object, there is provided a secondary battery including an electrode assembly formed by sequentially stacking positive electrode plates each having a positive electrode tab formed at one side thereof, negative electrode plate each having a negative electrode tab formed at one side thereof, and separators interposed between the positive electrode plates and the negative electrode plates, for insulating the positive and negative electrode plates from each other, the positive electrode tabs being welded to each other to form a positive electrode tab group, and the negative electrode tabs being welded to each other to form a negative electrode tab group, a case having a lower case part having a space in which the electrode assembly is accommodated, and an upper case part connected to one side periphery of the lower case part and fixed to the lower case part, for hermetically sealing the space of the lower case part, the upper case part and the lower case part having sealing portions at the peripheries thereof to be sealed to each other, a positive electrode terminal welded to the positive electrode tab group, the positive electrode tab group being supported in the sealing portion and protruding outward from the case, a negative electrode terminal welded to the negative electrode tab group, the negative electrode tab group being supported in the sealing portion thereof and protruding outward from the case, and short preventing means provided between the positive and negative electrode terminals and the case in a direction in which the terminals are folded.

In an embodiment of the present invention, the short preventing means,is an insulating member fixed to the positive electrode terminal and the negative electrode terminal.

In still another embodiment of the present invention, the short preventing means is an insulating member fixed to the front sidewall of the case.

Also, in another embodiment of the present invention, the short preventing means is a supporting portion formed by protruding the sealing portion outward from the case to support the positive and negative electrode terminals.

According to another aspect of the present invention, there is provided a secondary battery including an electrode assembly formed by sequentially stacking positive electrode plates each having a positive electrode tab formed at one side thereof, negative electrode plate each having a negative electrode tab formed at one side thereof, and separators interposed between the positive electrode plates and the negative electrode plates, for insulating the positive and negative electrode plates from each other, the positive electrode tabs being welded to each other to form a positive electrode tab group, and the negative electrode tabs being welded to each other to form a negative electrode tab group, a case having a lower case part having a space in which the electrode assembly is accommodated, and an upper case part connected to one side periphery of the lower case part and fixed to the lower case part, for hermetically sealing the space of the lower case part, the upper case part and the lower case part having sealing portions at the peripheries thereof to be sealed to each other, a positive electrode terminal welded to the positive electrode tab group, the positive electrode tab group being supported in the sealing portion and protruding outward from the case, a negative electrode terminal welded to the negative electrode tab group, the negative electrode tab group being supported in the sealing portion thereof and protruding outward from the case, and an electrolytic solution blocking member which envelops the electrode assembly.

The electrolytic solution blocking member is preferably a film envelop made of one material selected from the group consisting of polyethylene (PE), polyvinyl carbonate (PVC), hexafluoropropylene (HFP) and a mixture of polyvinylidene fluoride (PVDF) and HFP.

Here, short preventing means may be further provided between the positive and negative electrode terminals and the case in a direction in which the terminals are folded.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Preferred embodiments of the present invention will now be described in detail with reference to the accompanying drawings.

Figure 1:
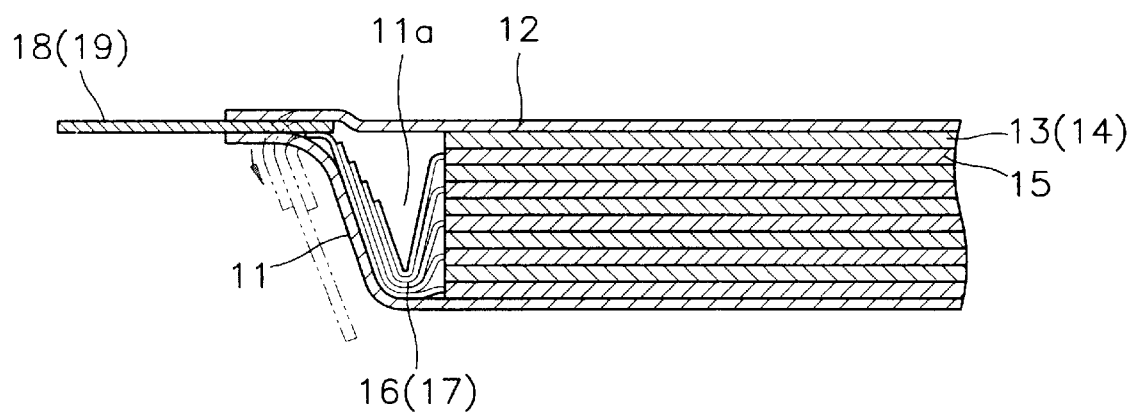
FIG. 1 is a side cross-sectional view schematically illustrating a part of a conventional secondary battery.
Figure 2:
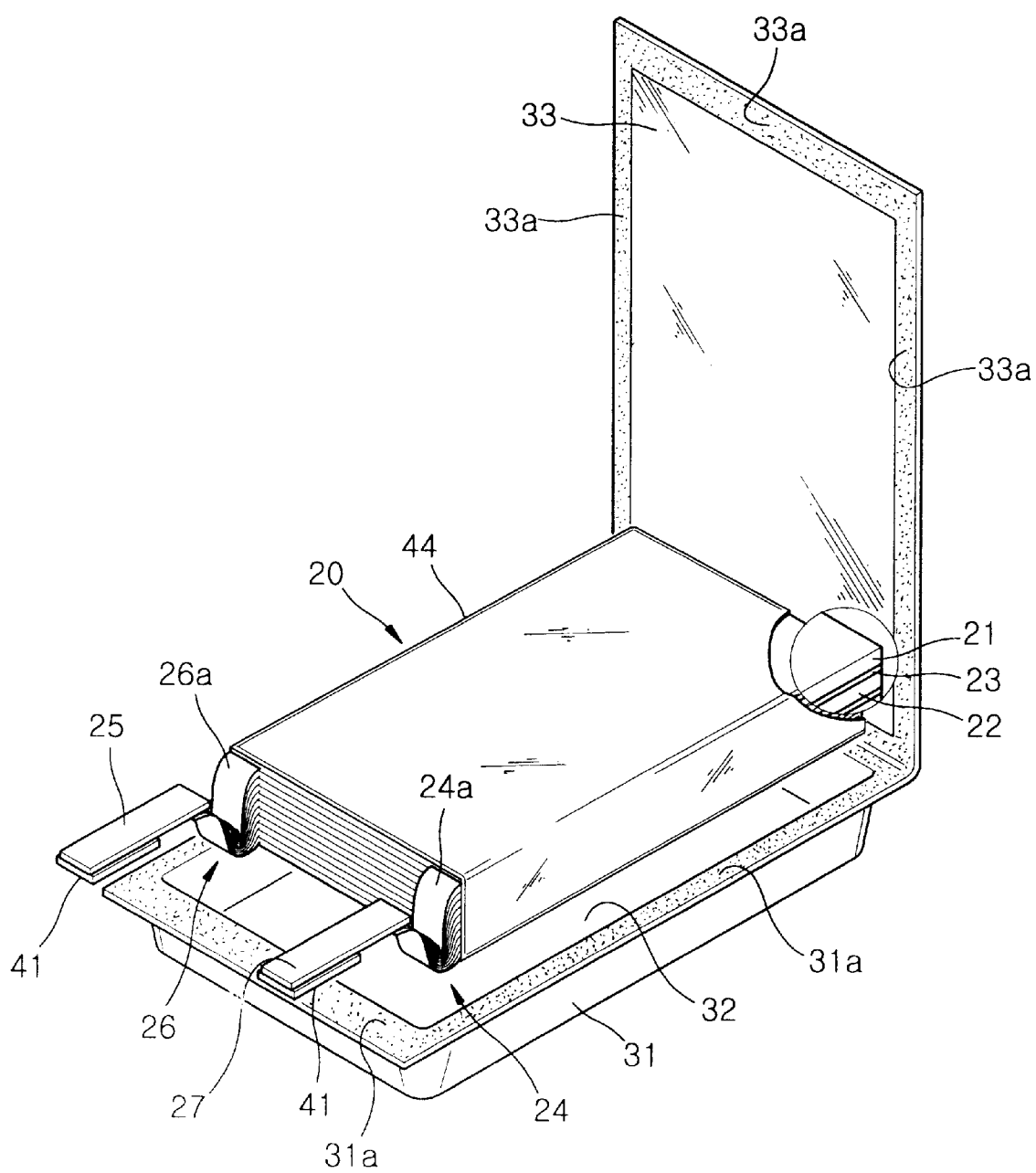
FIG. 2 is a partly cut-away exploded view schematically illustrating a secondary battery according to the present invention.

FIG. 2 is a partly cut-away exploded view schematically illustrating a secondary battery according to the present invention.

Referring to FIG. 2, the secondary battery according to the present invention, for example, a lithium polymer secondary battery includes an electrode assembly 20, a lower case 31 having a space 32 in which the electrode assembly 20 is accommodated, and an upper case 33 with one side periphery connected to the lower case 31, for hermetically closing the space 32 of the lower case 31.

The electrode assembly 20 has positive electrode plates 21 and negative electrode plates 22 stacked sequentially, with separators 23 being interposed therebetween. A positive electrode tab 26a extending from the positive electrode plate 21 is formed at one side thereof and a negative electrode tab 24a is formed at one side of the negative electrode plate 22. A plurality of positive electrode tabs 26a, each least at the positive electrode plate 21 are mutually welded to form a positive electrode tab group 26. Also, a plurality of negative electrode tabs 24a each drawn out from the negative electrode plate 22 in the same direction are mutually welded to form a negative electrode tab group 24. A positive electrode terminal 25 and a negative electrode terminal 27 each having predetermined lengths are welded to the positive and negative electrode tab groups 26 and 24, respectively.

When the electrode assembly 20 having the above-described configuration is inserted into the space 32 of the lower case 31, the positive electrode tab group 26 and the negative electrode tab group 24 are folded to have a V-shape and the electrode assembly 20 is placed in the space 32. Sealing portions 31a and 33a for hermetically covering the space 32 after the electrode assembly 20 is inserted into the space 32 of the lower case 31, are located at peripheries of the upper and lower cases 33 and 31. When the sealing portions 31a and 33a are sealed and the space 32 is hermetically closed, the positive electrode terminal 25 and the negative electrode terminal 27 respectively welded to the positive electrode tab group 26 and the negative electrode tab group 24 are interposed between the contacting portions of the lower case 31 and the upper case 33 and drawn outside the space 32.

Short-circuit preventing means for preventing a short-circuit due to contact between the positive and negative electrode terminals 25 and 27 and the upper and lower cases 33 and 31 is located at the positive electrode terminal 25 and the negative electrode terminal 27 or at either of the upper case 33 and the lower case 31, as will be described later.

Figure 3:
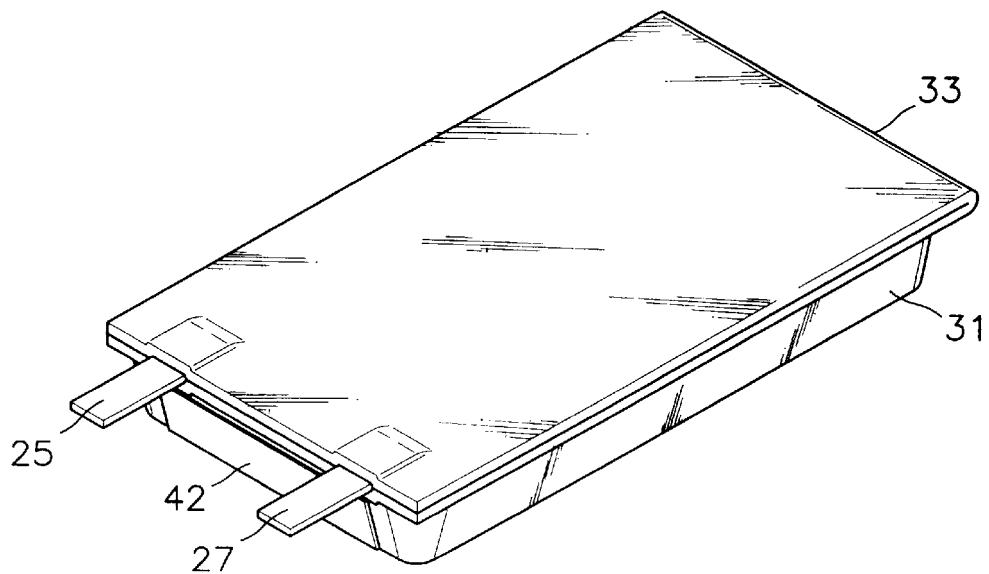
FIGS. 3 and 4 are perspective views illustrating the outward appearance of an assembled secondary battery shown in FIG. 2.

As a first example of the short preventing means, as shown in FIG. 2, a first insulating member 41 is fixed to the bottom surfaces of the positive electrode terminal 25 and the negative electrode terminal 27. In a second example of the short preventing means, as shown in FIG. 3, a second insulating member 42 is fixed to the front sidewall of the lower case 31. The first and second insulating members 41 and 42 are made of a PE tape which is an electrical insulating material. However, the material of the first and second insulating members 41 and 42 are not specifically restricted and any material that is easily fixed as an insulating material can be employed.

Figure 4:
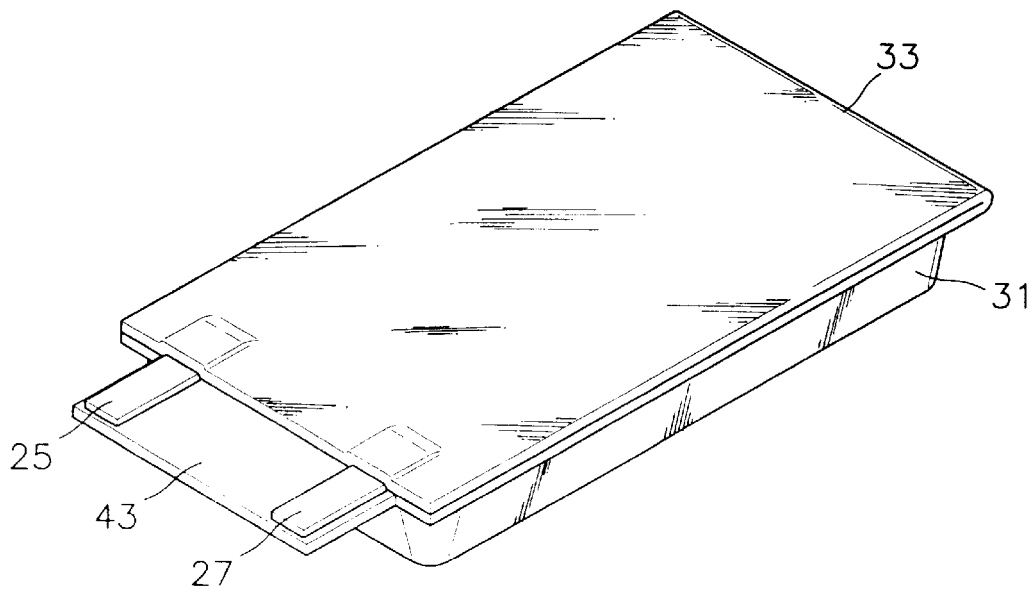

Alternatively, as a third example of the short preventing means, as shown in FIG. 4, a supporting portion 43 which is an outward protrusion of the front sealing portion 31a of the lower case 31, supports the positive electrode terminal 25 and the negative electrode terminal 27.

When the positive electrode terminal 25 and the negative electrode terminal 27 are connected to a battery pack (not shown) for being assembled, the positive electrode terminal 25, the negative electrode terminal 27 and the sealing portions 31a and 33a are folded. Generally, the positive electrode terminal 25 and the negative electrode terminal 27 are folded in a direction toward the lower case 31. Thus, in the first and second examples of the short preventing means, as shown in FIGS. 2 and 3, the first and second insulating members 41 and 42 are fixed to the bottom surfaces of the positive electrode terminal 25 and the negative electrode terminal 27, and to the front sidewall of the lower case 31, respectively.

However, in the case where the positive electrode terminal 25 and the negative electrode terminal 27 are folded in a direction toward the upper case 33, the first insulating member 41 should be fixed to the top surfaces of the positive electrode terminal 25 and the negative electrode terminal 27, and the second insulating member 42 should be fixed to the front sidewall of the upper case 33.

Referring back to FIG. 2, in order to prevent the electrolyte solution provided in the electrode assembly 20 from sticking to the sealing portions 31a and 33a, an electrolytic solution blocking member 44 which envelops the electrode assembly 20 is provided. The electrolyte solution blocking member 44 is formed of a material which does not dissolve in the electrolyte solution and is a film envelop made of one material selected from the group consisting of polyethylene (PE), polyvinyl carbonate (PVC), hexafluoropropylene (HFP) and a mixture of polyvinylidene fluoride (PVDF) and HFP. The electrode assembly 20 is put into the film envelope to then be sealed.

The operation of the aforementioned secondary battery according to the present invention will now be described. Here, the operation of a general secondary battery and a description thereof will be omitted and only the characteristic operation of the secondary battery according to the present invention will be explained.

As described above, the assembled battery unit 20 is immersed in the electrolyte solution, put into the above-described film envelop, that is, the electrolyte solution blocking member 44, and then inserted into the space 32 of the lower case 31. Then, the sealing portions 33a and 31a of the upper and lower cases 33 and 31 are hermetically sealed. Thereafter, the positive electrode terminal 25 and the negative electrode terminal 27 which protrude outward from the front surfaces of the upper and lower cases 33 and 31, and the sealing portions 31a and 33a, are folded and packed in the battery pack so as to minimize the volume, thereby completing the secondary battery.

Figure 5:
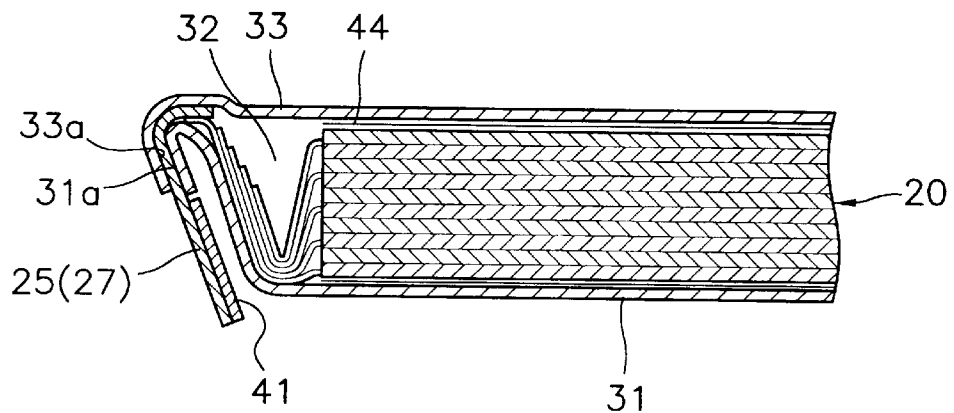
FIGS. 5 through 7 are side cross-sectional views schematically illustrating fabrication states of the secondary battery shown in FIG. 2.

FIG. 5 shows a state where the positive electrode terminal 25, the negative electrode terminal 27 and the sealing portions 31a and 33 are folded in the course of fabricating the battery.

Referring to FIG. 5, since the electrode assembly 20 to which the electrolyte solution sticks is contained in the electrolyte solution blocking member 44 and is put into the lower case 31 and hermetically sealed with the upper case 33, the electrolyte solution does not stick to the sealing portions 33a and 31a of the upper and lowers cases 33 and 31. As the electrolyte solution blocking member 44, a PVC film envelope or a film envelop made of a mixture of PVDF and HFP having an excellent elongation ratio is used, thereby enhancing safety such that the film envelope is rolled into a nail during a safety test and an overcharging piercing test.

Also, since the first insulating member 41 is fixed to each of the bottom surfaces of the positive electrode terminal 25 and the negative electrode terminal 27, even if the positive and negative electrode terminals 25 and 27 contact the lower case 31 as they are folded toward the lower case 31, short circuits do not occur.

Figure 6:
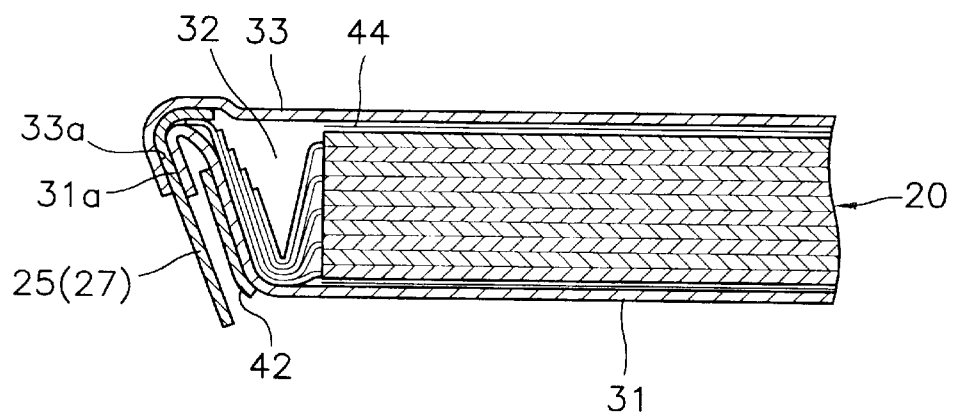
Figure 7:
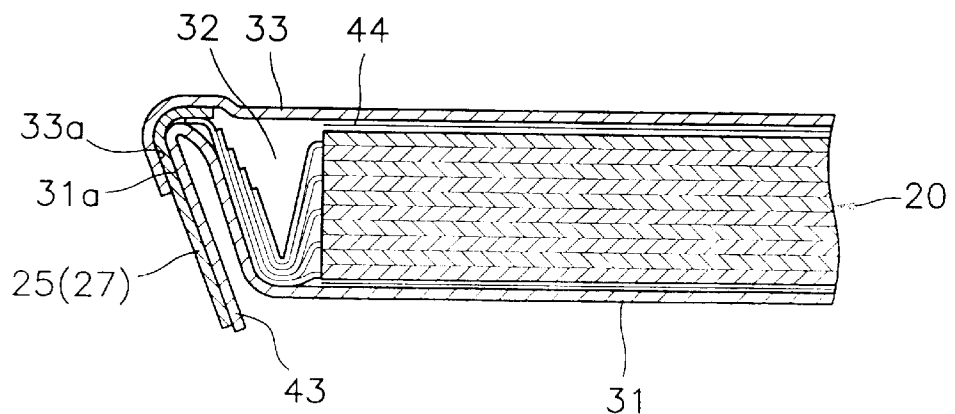

Also, in the case where the second insulating member 42, instead of the first insulating member 41, is fixed to the front sidewall of the lower case 31, as shown in FIG. 6, even if the positive and negative electrode terminals 25 and 27 contact the lower case 31 as the positive and negative electrode terminals 25 and 27, the sealing portions 31a and 33a are folded short circuits do not occur. Further, the supporting portion 43 is molded in such a manner as shown in FIG. 7, thereby supporting the positive and negative electrode terminals 25 and 27 and preventing short circuits from occurring, even if the positive and negative electrode terminals 25 and 27 are folded toward the lower case 31.

As described above, the secondary battery according to the present invention has the following advantages.

First, an electrode assembly smeared with an electrolyte solution is enveloped into an electrolyte solution blocking member and inserted into a case to prevent the electrolyte solution from sticking to the sealing portion of the case, thereby attaining an excellent sealing state and remarkably reducing the rate of defect sealing.

Second, in order to prevent short circuits due to contact between positive and negative electrode terminals and the case as the positive and negative electrode terminals which protrude outward from the case are folded during insertion of the battery into a battery pack or connection of terminals, short preventing means, such as an insulating member, is installed in the positive and negative electrode terminals or the case, thereby preventing short circuits in the battery.

Therefore, the productivity of the secondary batteries can be enhanced due to reduction of defects in production and safety thereof can be attained.

While the present invention has been described with respect to what is presently considered to be the preferred embodiment, it is to be understood that the disclosed embodiment is provided only for an exemplary embodiment. To the contrary, the present invention is intended to cover various modifications and equivalent arrangements included within the spirit and scope of the appended claims. Accordingly, the true scope and spirit of the invention will be indicated by the following claims.

What is claimed is:

1. A secondary battery comprising:
   an electrode assembly including, sequentially stacked,
      positive electrode plates, each positive electrode plate having a positive electrode tab at one side,
      negative electrode plates, each negative electrode plate having a negative electrode tab at one side, and
      separators, interposed between the positive electrode plates and the negative electrode plates, for insulating the positive and negative electrode plates from each other, the positive electrode tabs being welded to each other to form a positive electrode tab group, and the negative electrode tabs being welded to each other to form a negative electrode tab group;
   a case having a first case part having a volume in which the electrode assembly is accommodated and a peripherally extending flange, and a second case part having a peripheral flange connected to the peripheral flange of the first case part and fixed to the first case part, hermetically sealing the volume of the first case part, the second case part and the first case part having sealing portions at the respective peripheral flanges sealed to each other;
   a positive electrode terminal welded to the positive electrode tab group, the positive electrode tab group being supported in the sealing portion and protruding outward from the case;
   a negative electrode terminal welded to the negative electrode tab group, the negative electrode tab group being supported in the sealing portion and protruding outward from the case, wherein the first case part includes a supporting portion protruding outward from the sealing portion of the first case part, contacting and supporting the positive and negative electrode terminals to prevent short-circuiting.

2. The secondary battery according to claim 1, including an electrolyte solution blocking member enveloping the electrode assembly in the case.

3. The secondary battery according to claim 2, wherein the electrolyte solution blocking member is a film envelope made of a material selected from the group consisting of polyethylene, polyvinyl carbonate, hexafluoropropylene (HFP), and a mixture of polyvinylidene fluoride and HFP.

4. A secondary battery comprising:

an electrode assembly including, sequentially stacked,
positive electrode plates, each positive electrode plate having a positive electrode tab at one side,
negative electrode plates, each negative electrode plate having a negative electrode tab at one side, and
separators interposed between the positive electrode plates and the negative electrode plates, for insulating the positive and negative electrode plates from each other, the positive electrode tabs being welded to each other to form a positive electrode tab group, and the negative electrode tabs being welded to each other to form a negative electrode tab group;

a case having a first case part having a volume in which the electrode assembly is accommodated and a peripherally extending flange, and a second case part having a peripheral flange connected to one the peripheral flange of the first case part and fixed to the first case part, hermetically sealing the volume of the first case part, the second case part and the first case part having sealing portions at the respective peripheral flanges sealed to each other;

a positive electrode terminal welded to the positive electrode tab group, the positive electrode tab group being supported in the sealing portion and protruding outward from the case; and a negative electrode terminal welded to the negative electrode tab group, the negative electrode tab group being supported in the sealing portion and protrudign outward from the case; and first and second insulating members respectively fixed to the positive electrode terminal and to the negative electrode terminal, outside and separated from the case, on sides of the positive electrode terminal and the negative electrode terminal closer to the first case part than to the second case part.

5. The secondary battery according to claim 4, including an electrolyte solution blocking member enveloping the electrode assembly in the case.

6. The secondary battery according to claim 5, wherein the electrolyte solution blocking member is a film envelope made of a material selected from the group consisting of polyethylene, polyvinyl carbonate, hexafluoropropylene (HFP), and a mixture of polyvinylidene fluoride and HFP.

7. A secondary battery comprising:

an electrode assembly including, sequentially stacked,
positive electrode plates, each positive electrode plate having a positive electrode tab at one side,
negative electrode plates, each negative electrode plate having a negative electrode tab at one side, and
separators interposed between the positive electrode plates and the negative electrode plates, for insulating the positive and negative electrode plates from each other, the positive electrode tabs being welded to each other to form a positive electrode tab group, and the negative electrode tabs being welded to each other to form a negative electrode tab group;

a case having a first case part having a volume in which the electrode assembly is accommodated and a peripherally extending flange, and a second case part having a peripheral flange connected to one the peripheral flange of the first case part and fixed to the first case part, hermetically sealing the volume of the first case part, the second case part and the first case part having sealed portions at the respective peripheral flanges sealed to each other;

a positive electrode terminal welded to the positive electrode tab group, the positive electrode tab group being supported in the sealing portion and protruding outward from the case;

a negative electrode terminal welded to the negative electrode tab group, the negative electrode tab group being supported in the sealing portion and protruding outward from the case; and an insulating member fixed to an outside front sidewall of the first case for preventing short-circuiting of the positive and negative electrode terminals when the positive electrode terminal and the negative electrode terminal are bent at the sealing portions toward the first case part.

8. The secondary battery according to claim 7, including an electrolyte solution blocking member enveloping the electrode assembly in the case.

9. The secondary battery according to claim 8, wherein the electrolyte solution blocking member is a film envelope made of a material selected from the group consisting of polyethylene, polyvinyl carbonate, hexafluoropropylene (HFP), and a mixture of polyvinylidene fluoride and HFP.

* * * * *